Nov. 14, 1967          O. LINDSTRÖM                3,352,716
METHOD OF GENERATING ELECTRICITY FROM AMMONIA FUEL
Filed May 7, 1963                                2 Sheets-Sheet 1
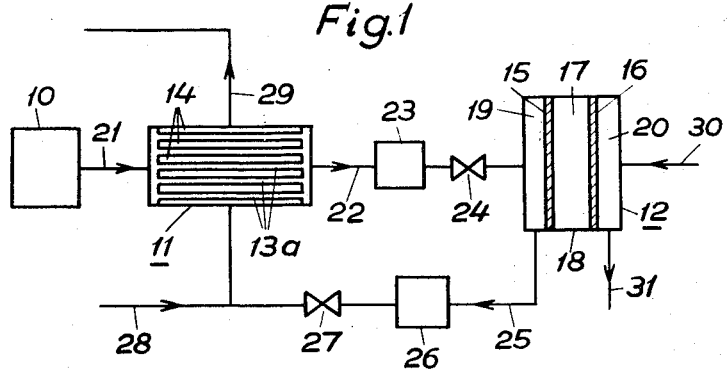
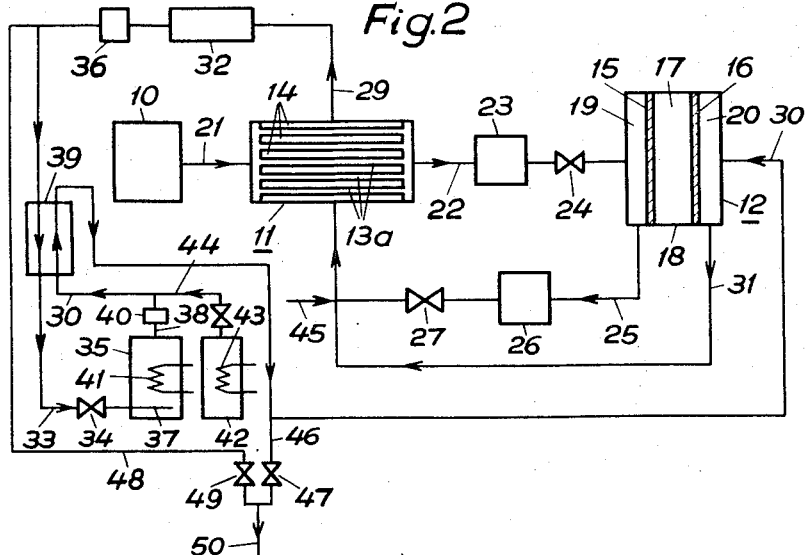
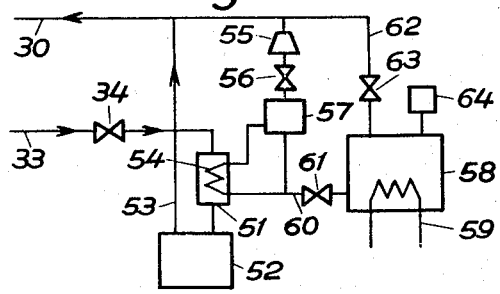
INVENTOR.
OLLE LINDSTRÖM Nov. 14, 1967          O. LINDSTRÖM          3,352,716

METHOD OF GENERATING ELECTRICITY FROM AMMONIA FUEL

Filed May 7, 1963          2 Sheets-Sheet 2

INVENTOR.
OLLE LINDSTRÖM
BY Bailey, Stephens & Huettig
ATTORNEY

3,352,716
METHOD OF GENERATING ELECTRICITY FROM AMMONIA FUEL
Olle Lindström, Vasteras, Sweden, assignor to Allmanna Svenska Elektriska Aktiebolaget, Vasteras, Sweden, a corporation of Sweden
Filed May 7, 1963, Ser. No. 278,732
Claims priority, application Sweden, May 18, 1962, 5,589/62
20 Claims. (Cl. 136—86)

Fuel cells with hydrogen as the combustible substance and oxygen or air as the oxidising substance have been the object of great interest, not least for ship operation because of the long operating times of fuel cell batteries built up of them. The need to store large amounts of hydrogen is however a very serious disadvantage with the use of fuel cells, especially because of the danger of explosion this involves and the large space needed for storing. This disadvantage is present not only when the fuel cells are used on ships but also inter alia when they are used as reserve power aggregates placed in a closed space.

The use of ammonia as such has been proposed as a active combustible substance in fuel cells. Using ammonia as fuel should in itself have great advantages, especially in arrangements where limited space is available for storing of the fuel. As ammonia may be kept simply in liquid form, this requires small vessels and storage space and freight costs will be small. The ammonia is moreover a cheap fuel. The ammonia, however, in spite of the said good qualifications in certain respects, has not been used in practice as fuel in fuel cells. This is connected with difficulties in producing a suffciently active electrode material, which can effectively effect the necessary oxidation of the ammonia.

According to the present invention the above-mentioned disadvantages are avoided, which are connected with storing of greater amounts of hydrogen and the advantages occurring with use of ammonia are made use of without the disadvantages associated with the earlier proposed use of ammonia occurring.

The invention relates to a method of supplying a fuel cell with combustible material in the form of hydrogen, which is supplied to a hydrogen chamber arranged in the fuel cell. The invention is characterised in that the hydrogen chamber of the fuel is connected to an ammonia cracker comprising a reaction chamber for cracking of the ammonia and a combustion chamber for heating of the reaction chamber, from which hydrogen and nitrogen formed in the reaction chamber are led to the hydrogen chamber of the fuel cell where the hydrogen is partly consumed for the fuel cell operation, and that hydrogen not consumed in the fuel cell together with the nitrogen are led to the combustion chamber of the ammonia cracker and are there used as fuel. According to the invention the advantages of the ammonia from a storage point of view are thus made use of and the large reactivity of hydrogen which is superior to that of ammonia. The disposal of the hydrogen according to the invention is of particularly great importance. A condition that a fuel cell with a fuel consisting of hydrogen and nitrogen shall work with good efficiency is that the hydrogen percentage is high. With low hydrogen percentage the efficiency is poor and the cell voltage low. Since the gas mixture coming from the cracker is supplied to the hydrogen chamber of the fuel cell, and the gas led away from the hydrogen chamber, in which gas the hydrogen percentage is substantially lower, is not used as fuel in the fuel cell but as an energy source for the ammonia cracking, maximum use can be made of the hydrogen. During combustion of the hydrogen in the combustion chamber of the cracker the hydrogen is used completely even if its percentage in the gas mixture is low. In order to avoid using an extra heating arrangement in the cracker, it is especially suitable to adapt the supply of the hydrogen and nitrogen to the fuel cell hydrogen chamber and discharge of them therefrom so that the amount of hydrogen not consumed in the fuel cell, which is used as fuel in the combustion chamber of the ammonia cracker during the combustion there, gives just that energy which is necessary so that the cracking shall continue while maintaining the desired gas supply to the hydrogen chamber of the fuel cell which in the majority of practical cases means that somewhat more than two-thirds of the amount of hydrogen supplied to the fuel cell is used there and somewhat less than one third of it is used as fuel in the combustion chamber of the ammonia cracker.

The method according to the invention may be used with advantage for operation of fuel cell machinery, e.g. for submarines while simultaneously supplying the fuel cell machinery with oxygen from a container containing liquid oxygen and possibly liquid nitrogen. Fuel cells are used with oxygen chambers to which oxygen is led which preferably is only partly consumed for operation of the fuel cell. According to an embodiment of the invention the hydrogen led to the combustion chamber of the ammonia cracker is there burned up with unconsumed oxygen from the oxygen chamber of the fuel cell, and at least a part of the exhaust from the combustion chamber of the ammonia cracker is led after removal of any water vapor which may be formed to the container with liquid oxygen and possibly liquid nitrogen, where it mixes with the contents of the container while giving up at least a part of the nitrogen of the exhaust and taking up oxygen present in the container after which the gas enriched with oxygen is led to the oxygen chamber of the fuel cell and is there used as the oxidising substance. Nitrogen formed in the ammonia cracker or at least the main part of it is thereby collected in the container. It is particularly advantageous to adapt the exhaust supply to the container so that the amount of nitrogen given up by the exhaust in the container corresponds to the amount of new nitrogen produced simultaneously in the ammonia cracker.

According to another embodiment of the invention the hydrogen led to the combustion chamber of the ammonia cracker is burned up with unconsumed oxygen from the oxygen chamber of the fuel cell and at least a part of the exhaust from the combustion chamber of the ammonia cracker is led after removal of any water vapor which may be formed to a condenser, which is cooled with liquid oxygen at a lower pressure than the pressure in the exhaust, at least a part of the nitrogen in the exhaust then being condensed with simultaneous vaporization of the oxygen used as cooling medium, which oxygen is led to the oxygen chamber of the fuel cell, possibly mixed with non-condensed nitrogen, and is there used for supplying the fuel cell with oxygen. It is particularly advantageous to adapt the amount of nitrogen condensed in the condenser so that it corresponds to the amount of new nitrogen produced simultaneously in the ammonia cracker. A special advantage of the mentioned embodiments of the invention is that they can be used for renewal of the atmosphere in the submarine.

Oxygen maintenance to the oxygen chamber of the fuel cell in submarines may also occur by means of oxygen recovery from seawater. The hydrogen led to the combustion chamber of the ammonia cracker is then burned up as in the above mentioned cases with unconsumed oxygen from the oxygen chamber of the fuel cell and the exhaust from the combustion chamber of the ammonia cracker is led to a gas exchanger, where it comes into contact with seawater passing through the gas exchanger while giving up a part of the nitrogen of the exhaust and taking up oxygen dissolved in the seawater, after which the gas enriched with oxygen is led to the oxygen chamber of the fuel cell and is there used as the oxidising substance. The exhaust from the combustion chamber of the cracker consists mainly of nitrogen gas. The condition for oxygen being taken up upon contact with the seawater is that only a part of the nitrogen is dissolved so that there is always nitrogen present in the gas exchanger, with which the oxygen may be mixed and conveyed out of the gas exchanger. For oxygen recovery nitrogen is thus used which has less solubility in water than oxygen. The principle of using oxygen dissolved in seawater as the oxidising substance is known for combustion motors in submarines. There the combustion gases have been used for oxygen recovery and it has been presumed that a condition for the functional efficiency of the method is that the combustion gases should have a greater solubility in water than oxygen.

The invention will be explained in more detail by describing a number of embodiments with reference to the accompanying drawing, in which:

FIGURE 1 illustrates schematically an arrangement for carrying out the method according to the invention;

FIGURE 2 shows schematically an arrangement for using the method in a submarine with oxygen supply from a container containing liquid oxygen, with which nitrogen is brought into direct contact;

Figure 4:
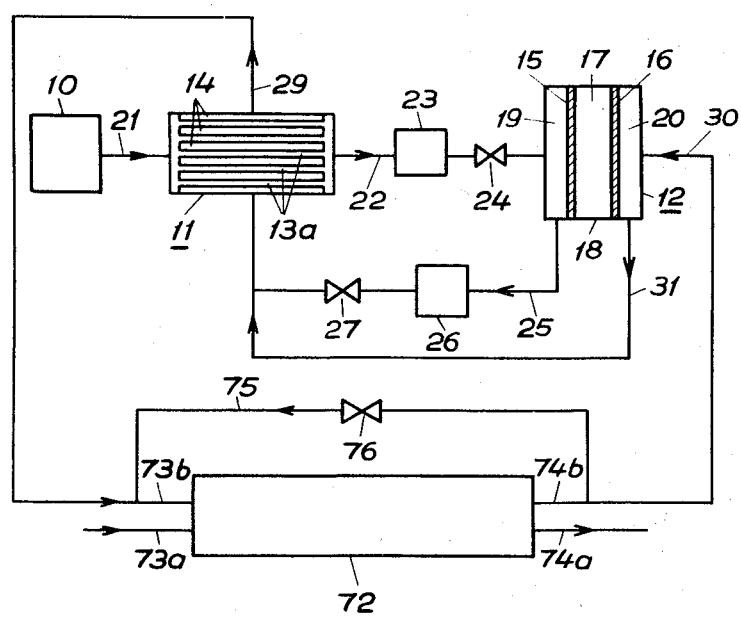

FIGURE 3 shows schematically a modification of the arrangement according to FIGURE 2, where the oxygen maintenance is arranged by evaporation of oxygen while condensing the nitrogen of the exhaust in a condenser where the media are in indirect contact with each other; and FIGURE 4 illustrates schematically an arrangement for using the method in a submarine using recovery of oxygen from the seawater, with which the exhaust is brought into direct contact.

The arrangement according to FIGURE 1 comprises in principle three units, namely a tank 10 containing liquid ammonia, an ammonia cracker 11 and a fuel cell 12. The ammonia cracker comprises a reaction chamber, e.g. consisting of several tubes or retorts 13a containing a suitable cracking catalyst with for example iron oxide, nickel or platinum as the active component and a combustion chamber 14 surrounding the tubes 13a. The fuel cell contains two porous electrodes 15 and 16. Between the electrodes is the electrolyte 17 in the electrolyte chamber 18. Outside the electrode 15 is a gas chamber 19 for the fuel and outside the electrode 16 a gas chamber 20 for the oxidising substance. The electrode 15 may for example consist of an active nickel electrode produced in a known way by pressing and sintering a powder mixture of aluminium nickel alloy and carbonyl nickel, after which the sintered product is activated by removing the aluminium with alkali. The electrode 16 may for example consist of silver electrode produced in an analogous and likewise known way of a powder mixture of silver-aluminium alloy and carbonyl nickel. The electrolyte 17 may consist of for example potassium hydroxide solution. The operating temperature may be about 80° C. When the arrangement is in operation the ammonia is conveyed from the tank 10 by the conduit 21 to the cracker 11 where two volumes of ammonia are cracked with the formation of one volume of nitrogen and three volumes of hydrogen. The mixture of nitrogen gas and hydrogen gas is led by the conduit 22, which may contain a smaller buffer tank 23 and a control valve 24 to the gas chamber 19 of the fuel cell where a greater part, preferably about two-thirds of the hydrogen, is consumed by oxidation when the electrode reaction takes place. The remaining hydrogen gas together with the unchanged nitrogen gas passes by the conduit 25, which may contain a smaller buffer tank 26 and a control valve 27, to the combustion chamber 14 of the cracker 11, where it is burned up by air or oxygen gas, which may be supplied by the conduit 28, before the gases reach the cracker. The combustion chamber may also lie outside the actual cracker, from which the warm combustion gases are led into the actual cracker in order to heat the gas in the reaction chamber. The combustion gases, which consist of water vapour, nitrogen gas and possibly excess oxygen gas are led away by the conduit 29. The nitrogen gas may, if the arrangement is used in a submarine, with advantage be condensed so that the submarine is not revealed by gas bubbles. If such a large hydrogen consumption is allowed in the fuel cell that the amount of unconsumed hydrogen gas is insufficient to maintain the combustion necessary for the cracking of the ammonia, the cracker may be equipped with an extra heating arrangement, e.g. consisting of electric resistance coils. The oxidising substance may consist of oxygen gas or air which is led to the oxygen chamber 20 through the conduit 30. Any nitrogen gas which is present and possible excess oxygen gas is removed through the conduit 31.

In the arrangement according to FIGURE 2 which partly contains the same units as FIG. 1 designated in the same way indicated units as FIGURE 1, the exhaust from the combustion chamber 14 of the cracker is led by the conduit 29 to a condenser 32 for removal of water vapour content in the exhaust. Before the exhaust is led by the conduit 33 with the valve 34 to the container 35 containing liquid oxygen and possibly liquid nitrogen, it passes a drying device 36, e.g. with molecular filters or silica gel for removal of any remaining traces of water vapour and other absorbable material. The exhaust may be led directly into the container 35, e.g. through one or more perforated inlet pipes 37 arranged at the bottom of the container. In the container at least a part of the nitrogen gas is dissolved, whereby oxygen gas is simultaneously vapourised. The gas enriched with oxygen gas passes through the conduits 38 and 30, after being heated in a heat exchanger 39 which simultaneously is used for cooling of the nitrogen gas led to the container 35, to the oxygen chamber of the fuel cell 20, where the oxygen gas is partly consumed. Unconsumed oxygen gas is led by the conduit 31 to the combustion chamber 14 of the ammonia cracker where it acts as the oxidising substance for the hydrogen gas from the hydrogen chamber 19 of the fuel cell. In order to safely maintain the nitrogen gas balance in the system, so that the amount of nitrogen gas which remains in the container 35 is as large as that produced simultaneously in the cracker 11, a part of the exhaust gas from the tank 35 may be condensed in the liquefier 40. The tank 35 contains a heating coil 41 for leading through a heating medium so that the necessary temperature and thereby the necessary pressure may be maintained in the tank. Adjustment of the amount of oxygen gas in the conduit 30 occurs through evaporation of oxygen from the tank 42 with the heating coil 43. The tank 42 contains pure oxygen and the oxygen is led away by the conduit 44 to the conduit 30. For renewal of the atmosphere in the submarine used air may be taken in at 45. Oxygen rich gas may thereby be taken out through the conduit 46 with the valve 47 and mixed with oxygen-poor gas from the conduit 48 with the valve 49. The mixture is led out into the submarine by the conduit 50 so that the pressure and composition of the atmosphere in the submarine are kept constant. The impurities in the used air are burned up in the ammonia cracker.

FIGURE 3 shows a modification of FIGURE 2, where the arrangements 35, 37, 38, 40, 41, 42, 43 and 44 are different while the remaining arrangements are the same. According to FIGURE 3 the exhaust coming through the conduit 33 is led through condenser 51 where at least a part of the nitrogen gas is condensed and collected in the container 52. Uncondensed exhaust is led by the conduit 53 to the conduit 30. The condensation of the nitrogen gas is effected by liquid oxygen, which is kept at a lower pressure than the exhaust so that its boiling point is below the boiling point for the nitrogen, being led through a cooling coil 54 in the condenser. The lower pressure in the cooling coil is maintained by means of the pump 55 and is regulated with the valve 56. Vapourised oxygen gas is separated from liquid oxygen in the separating vessel 57. The liquid oxygen is supplied to the cooling coil 54 from the oxygen tank 58 provided with the heating coil 59 through the conduit 60 containing the valve 61. The valve 61 is controlled by the liquid level in the separating vessel 57, so that complete evaporation of the liquid in the separating vessel 57 is prevented. The conduit 30 may also be supplied with oxygen gas directly from the tank 58 by the conduit 62 containing the valve 63. In order to maintain the nitrogen gas balance in the system, so that the amount of nitrogen gas which remains in the container 52 is as large as the amount of new nitrogen produced simultaneously in the cracker 11, the temperature of the oxygen in the cooling coil 54 and thereby the cooling effect is regulated by adjusting the pressure in the separating vessel 57 with the valve 56. Adjustment of the amount of oxygen gas in the conduit 30 occurs by means of evaporation of oxygen from the tank 58 with the heating coil 59. At very low power output from the fuel cell battery heat leakage into the system may be so high that the amount of oxygen gas which escapes in the conduit 30 exceeds that consumed by the fuel cell and the ammonia cracker, whereby the oxygen pressure would increase in the system. This may be prevented by using a liquefier 64.

In the arrangement according to FIGURE 4, which partly contains the same units and indicated in the same way as FIGURE 1, the exhaust from the combustion chamber 14 of the cracker is led by the conduit 29 to a gas exchanger 72. This may for example consist of an open longitudinal channel arranged in or near the bottom of the submarine, which takes up a considerable part of the cross section of the boat. Since large amounts of water and gas must be mixed because of the low oxygen content of the water, the volume of the channel is considerable. When the boat is in motion seawater enters the gas exchanger at its forward end 73a and leaves it after passage through it at its stern end 74a. The gas from the conduit 29 enters for example through nozzles in the gas exchanger at the forward end 73b of the boat. In the gas exchanger a part of the nitrogen of the exhaust is dissolved in the water, while oxygen gas dissolved in the water is taken up by nitrogen gas bubbles during their transport aft, which then consequently do not completely dissolve. The gas enriched with oxygen gas is taken out of the exchanger and into the boat through a valve arrangement in the stern end 74b of the boat, which arrangement lets in the gas but keeps out the water. The oxygen-rich gas then passes by the conduit 30 to the oxygen chamber 20 of the fuel cell, where the oxygen gas is partly consumed. Unconsumed oxygen gas is led via the conduit 31 to the combustion chamber 14 of the ammonia cracker, where it acts as the oxidising agent for the hydrogen gas from the hydrogen gas chamber 19 of the fuel cell. If the gas exchanger is dimensioned so that the amount of nitrogen gas given up by the exhaust therein is as large as the amount of new nitrogen gas produced simultaneously in the ammonia cracker, the nitrogen gas balance in the system can be maintained. The gas exchange cannot in general be carried out so that the need for oxygen gas is exactly covered by the amount taken up from the water. In general the taking up of oxygen gas is the more effective process, and material balance is then easily effected by means of recirculation of the gas from the exchanger through the conduit 75 with the control valve 76. With the use of the case mentioned in connection with the description of FIGURE 1 as being especially advantageous, that the amount of hydrogen not consumed in the fuel cell which is used as fuel in the combustion chamber of the ammonia cracker gives just the energy necessary so that the cracking will continue while maintaining the desired gas supply to the hydrogen chamber of the fuel cell, the conditions will be as follows with the case described in FIGURE 4 as example. Cracking of 2 volumes of ammonia gas in the cracker 11 gives 1 volume of nitrogen gas and 3 volumes hydrogen gas in the conduit 22. Of this about 2 volumes of hydrogen gas is consumed in the fuel cell and therefore about 1 volume of nitrogen gas and about 1 volume of hydrogen gas pass to the conduit 25. From the conduit 31 comes nitrogen gas, e.g. 1 volume, and about ½ volume of oxygen gas which is required for the combustion of the hydrogen gas in the cracker. In the conduit 29 the combustion gas then consists of about 2 volumes of nitrogen gas and about 1 volume of water vapour, with a little excess oxygen. In the gas exchanger 72 the gas gives up the vapour and further nitrogen gas and takes up oxygen gas. The gas exchanger 72 is dimensioned and the adjusting conduit 75 connected to it is adjusted so that the total result of the exchanging in the gas exchanger and the adjusting conduit is that about 1 volume of nitrogen is given up and about 1½ volumes of oxygen gas are taken up by the gas. In the conduit 30 the gas then consists of about 1 volume nitrogen gas and about 1½ volumes of oxygen gas, which is necessary if the oxygen gas is to be sufficient to consume the stated amount of about 2 volumes of hydrogen gas in the fuel cell and oxidise the stated amount of about 1 volume hydrogen gas in the combustion chamber of the cracker. The amount of nitrogen gas passing through the oxygen chamber 20 of the fuel cell and through the conduits 25 and 30 is not critical, but should not be too large in order to avoid blocking of the electrode pores by the inert nitrogen gas. Analogous conditions apply for the embodiment according to FIGURES 2 and 3. Consequently in these the oxygen gas supply through the conduit 30 is adapted so that the oxygen is at least sufficient for the reaction with the hydrogen in the fuel cell and in the combustion chamber of the ammonia cracker.

I claim:

1. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, supplying oxygen to the oxygen chamber, only partly consuming the oxygen in the fuel cell for the fuel cell operation, leading the unconsumed oxygen to the combustion chamber of the ammonia cracker to act as an oxidant for the burning of the hydrogen in the combustion chamber of the ammonia cracker, removing water vapour from at least a part of the exhaust gas formed in the combustion chamber of the ammonia cracker and leading the substantially vapour-free exhaust gas to a container containing liquid oxygen, mixing the exhaust gas with the contents of the container so that the exhaust gas gives up at least a part of its nitrogen and takes up oxygen present in the container, and leading the exhaust gas enriched with oxygen to the oxygen chamber of the fuel cell, whereby the oxygen of the container is used for supplying the fuel cell with oxygen and at least the main part of the nitrogen formed in the ammonia cracker is collected in the container.

2. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, supplying oxygen to the oxygen chamber, only partly consuming the oxygen in the fuel cell for the fuel cell operation, leading the unconsumed oxygen to the combustion chamber of the ammonia cracker to act as an oxidant for the burning of the hydrogen in the combustion chamber of the ammonia cracker, removing water vapour from at least a part of the exhaust gas formed in the combustion chamber of the ammonia cracker therefrom, leading the substantially vapour-free exhaust gas to a condenser, cooling the condenser with liquid oxygen of lower pressure than the pressure of the exhaust gas, at least a part of the nitrogen in the exhaust gas then being condensed with simultaneous vapourization of the oxygen used as the cooling medium, and leading the vapourised oxygen to the oxygen chamber of the fuel cell for supplying the fuel cell with oxygen.

3. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, feeding oxygen to said oxygen chamber, only partly consuming the oxygen in the fuel cell for the fuel cell operation, leading the unconsumed oxygen to the combustion chamber of the ammonia cracker to act as the oxidant for the burning of the hydrogen in the combustion chamber of the ammonia cracker, leading exhaust gas formed in the combustion chamber of the ammonia cracker to a gas exchanger, bringing the exhaust gas in the gas exchanger into contact with seawater passing through the gas exchanger, said exhaust gas thereby giving up of a part of the nitrogen contained therein and taking up oxygen dissolved in the seawater, and leading the exhaust gas enriched with oxygen to the oxygen chamber of the fuel cell, to form at least a part of the supply of oxygen to the fuel cell.

4. Method of supplying a fuel cell in a submarine with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, furnishing oxygen to the oxygen chamber, only partly consuming the oxygen in the fuel cell for the fuel cell operation, leading the unconsumed oxygen in the fuel cell to the combustion chamber of the ammonia cracker to act as combustion chamber of the ammonia cracker to act as an oxidant for the burning of the hydrogen in the combustion chamber of the ammonia cracker, leading exhaust gas formed in the combustion chamber of the ammonia cracker to a gas exchanger, bringing the exhaust gas in the gas exchanger into contact with seawater passing through the gas exchanger, said exhaust gas thereby giving up a part of the nitrogen contained therein and taking up oxygen dissolved in the seawater, and leading the exhaust gas enriched with oxygen to the oxygen chamber of the fuel cell, to form at least a part of the supply of oxygen to the fuel cell, adjusting the amount of oxygen in the exhaust gas enriched with oxygen led to the oxygen chamber of the fuel cell to maintain the volume of the oxygen taken up in the gas exchanger and transported to the oxygen chamber of the fuel cell at an amount one and a half times as great as the volume of nitrogen simultaneously dissolved by the seawater in the gas exchanger.

5. In a method of supplying a fuel cell with fuel, the steps of cracking ammonia, feeding the hydrogen and nitrogen formed by such cracking to the fuel cell, consuming the hydrogen only partly in the fuel cell, burning the nonconsumed hydrogen and supplying the heat of such burning to the cracking step, removing water vapor from the exhaust gas from such burning, bringing at least a part of the substantially vapor-free exhaust gas into contact with liquid oxygen, said liquid oxygen taking up a part of the nitrogen in the exhaust gas and giving up oxygen thereto, said oxygen-enriched exhaust gas being used in the step of supplying oxygen to the fuel cell.

6. In a process as claimed in claim 5, maintaining the amount of nitrogen given up to the liquid oxygen substantially equal to the amount of nitrogen produced by the cracking of the ammonia.

7. In a method of supplying a fuel cell with fuel, the steps of cracking ammonia, feeding the hydrogen and nitrogen formed by such cracking to the fuel cell, consuming the hydrogen only partly in the fuel cell, burning the nonconsumed hydrogen and supplying the heat of such burning to the cracking step, removing water vapor from the exhaust gas from such burning, bring at least a part of the substantially vapor-free exhaust gas into heat exchange relation with liquid oxygen, thereby condensing a part of the nitrogen in the exhaust gas and vaporizing a part of the liquid oxygen, the vaporized oxygen being used in the step of supplying oxygen to the fuel cell.

8. In a method a supplying a fuel cell with fuel, the steps of cracking ammonia, feeding the hydrogen and nitrogen formed by such cracking to the fuel cell, consuming the hydrogen only partly in the fuel cell, burning the nonconsumed hydrogen and supplying the heat of such burning to the cracking step, bringing the exhaust from such burning in contact with sea water, whereby the exhaust gas takes up oxygen from the sea water and loses nitrogen thereto, and feeding said enriched exhaust gas together with the oxygen supplied to the fuel cell to be used in the step of supplying oxygen to the fuel cell.

9. In a process as claimed in claim 8, maintaining the amount of nitrogen lost to the sea water at least substantially equal to the amount of nitrogen produced by the cracking of the ammonia.

10. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, tthe fuel cell having an oxygen chamber, supplying oxygen to the oxygen chamber, removing water vapor from at least a part of the exhaust gas formed in the combustion chamber of the ammonia cracker and leading the substantially vapor-free exhaust gas to a container containing liquid oxygen, mixing the exhaust with the contents of the container so that the exhaust gas gives up at least a part of its nitrogen and takes up oxygen present in the container, and leading the exhaust gas enriched with oxygen to the oxygen chamber of the fuel cell, whereby the oxygen of the container is used for supplying the fuel cell with oxygen and at least the main part of the nitrogen formed in the ammonia cracker is collected in the container.

11. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, feeding oxygen to the oxygen chamber, removing water vapor from at least a part of the exhaust gas formed in the combustion chamber of the ammonia cracker therefrom, leading the substantially vapor-free exhaust gas to a condenser, cooling the condenser with liquid oxygen of lower pressure than the pressure of the exhaust gas, at least a part of the nitrogen in the exhaust gas then being condensed with simultaneous vaporization of the oxygen used as the cooling medium, and leading the vaporized oxygen to the oxygen chamber of the fuel cell for supplying the fuel cell with oxygen.

12. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, feeding oxygen to said oxygen chamber, leading exhaust gas formed in the combustion chamber of the ammonia cracker to a gas exchanger, bringing the exhaust gas in the gas exchanger into contact with sea water passing through the exchanger, said exhaust gas thereby giving up a part of the nitrogen contained therein and taking up oxygen dissolved in the sea water, and leading the exhaust gas enriched with oxygen to the exhaust chamber of the fuel cell, to form at least a part of the supply of oxygen to the fuel cell.

13. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, the fuel cell having an oxygen chamber, feeding oxygen to the oxygen chamber, leading exhaust gas formed in the combustion chamber of the ammonia cracker to a gas exchanger, bringing the exhaust gas in the gas exchanger into contact with sea water passing through the gas exhanger, said exhaust gas thereby giving up a part of the nitrogen contained therein and taking up oxygen dissolved in sea water, and leading the exhaust gas enriched with oxygen to the oxygen chamber of fuel cell, to form at least a part of the supply of oxygen to the fuel cell, and adjusting the amount of oxygen chamber of the fuel cell to maintain the volume of the oxygen taken up in the gas exchanger and transported to the oxygen chamber of the fuel cell at an amount one and a half times as great as the volume of nitrogen simultaneously dissolved by the seawater in the gas exchanger.

14. In a method of supplying a fuel cell with fuel, the steps of cracking ammonia, feeding the hydrogen and nitrogen formed by such cracking to the fuel cell, consuming the hydrogen only partly in the fuel cell, burning the non-consumed hydrogen, supplying the heat of such burning to the cracking step, and maintaining the supply of hydrogen to the fuel cell at such a value that the burning of the hydrogen not consumed therein supplies substantially exactly the total energy needed for such cracking.

15. In a method of supplying a fuel cell with fuel, the steps of cracking ammonia, feeding the hydrogen and nitrogen formed by such cracking to the fuel cell, consuming the hydrogen only partly in the fuel cell, the unconsumed hydrogen being mixed with the nitrogen, supplying an excess of oxygen to the fuel cell, mixing the unconsumed oxygen with the unconsumed hydrogen and nitrogen, burning the resulting mixture, supplying the heat of such burning to the cracking step and removing water vapor from the exhaust gas from such burning, bringing at least a part of the substantially vapor-free exhaust gas into contact with liquid oxygen, said liquid oxygen taking up a part of the nitrogen in the exhaust gas and giving up oxygen thereto, said oxygen-enriched exhaust gas being used in the step of supplying oxygen to the fuel cell.

16. In a process as claimed in claim 15, maintaining the amount of nitrogen given up to the liquid oxygen substantially equal to the amount of nitrogen produced by the cracking of the ammonia.

17. In a method of supplying a fuel cell with fuel, the steps of cracking ammonia, feeding the hydrogen and nitrogen formed by such cracking to the fuel cell, consuming the hydrogen only partly in the fuel cell, the unconsumed hydrogen being mixed with the nitrogen, supplying an excess of oxygen to the fuel cell, mixing the unconsumed oxygen with the unconsumed hydrogen and nitrogen, burning the resulting mixture, supplying the heat of such burning to the cracking step, removing water vapor from the exhaust gas from such burning and bringing at least a part of the substantially vapor-free exhaust gas into heat exchange relation with liquid oxygen, thereby condensing a part of the nitrogen in the exhaust gas and vaporizing a part of the liquid oxygen, the vaporized oxygen being used in the step of supplying oxygen to the fuel cell.

18. In a method of supplying a fuel cell with fuel, the steps of cracking ammonia, feeding the hydrogen and nitrogen formed by such cracking to the fuel cell consuming the hydrogen only partly in the fuel cell, the unconsumed hydrogen being mixed with the nitrogen, supplying an excess of oxygen to the fuel cell, mixing the unconsumed oxygen with the unconsumed hydrogen and nitrogen, burning the resulting mixture supplying the heat of such burning to the cracking step, bringing the exhaust gas from such burning in contact with sea water whereby the exhaust gas takes up oxygen from the sea water and loses nitrogen thereto, and feeding said enriched exhaust gas together with the oxygen supplied to the fuel cell to be used in the step of supplying oxygen to the fuel cell.

19. In a process as claimed in claim 18, maintaining the amount of nitrogen lost to the sea water at least substantially equal to the amount of nitrogen produced by the cracking of the ammonia.

20. Method of supplying a fuel cell with fuel in the form of hydrogen, which is supplied to a hydrogen chamber arranged in the fuel cell, the hydrogen chamber of the fuel cell being connected to an ammonia cracker comprising a reaction chamber for cracking of the ammonia and a combustion chamber for heating the reaction chamber, comprising the steps of cracking ammonia in the cracker, leading hydrogen and nitrogen formed in the reaction chamber of the ammonia cracker to the hydrogen chamber of the fuel cell, only partly consuming the hydrogen in the fuel cell for the fuel cell operation, burning the unconsumed hydrogen mixed with the nitrogen in the combustion chamber of the ammonia cracker, adjusting the supply of the hydrogen and nitrogen to the hydrogen chamber of the fuel cell and discharge of them therefrom to maintain the amount of hydrogen not consumed in the fuel cell, which is used as fuel in the combustion chamber of the ammonia cracker during combustion, to give substantially exactly the total energy necessary for the cracking therein.

References Cited

UNITED STATES PATENTS

| | | | |
|---|---|---|---|
| 2,242,108 | 5/1941 | Bullowa et al. | 62—50 X |
| 3,132,013 | 9/1960 | Kumamoto et al. | 55—53 |
| 3,146,131 | 8/1964 | Linden et al. | 136—86 |
| 3,150,657 | 9/1964 | Shultz et al. | 136—86 |
| 3,181,848 | 5/1965 | Miller | 136—86 X |
| 3,183,123 | 5/1965 | Haworth | 136—86 |
| 3,222,223 | 12/1965 | Platner | 136—86 |

OTHER REFERENCES

Dravnieks et al., Fuel Cells With Ion-Exchange Electrolytes, in Electrotechnology, June 1962, pages 135, 136.

ALLEN B. CURTIS, *Primary Examiner.*

WINSTON A. DOUGLAS, *Examiner.*